(12) United States Patent
Tollet

(10) Patent No.: US 11,265,372 B2
(45) Date of Patent: Mar. 1, 2022

(54) IDENTIFICATION OF A PROTOCOL OF A DATA STREAM

(71) Applicant: QOSMOS TECH, Paris (FR)

(72) Inventor: Jérôme Tollet, Paris (FR)

(73) Assignee: QOSMOS TECH, Paris (FR)

( * ) Notice: Subject to any disclaimer, the term of this patent is extended or adjusted under 35 U.S.C. 154(b) by 0 days.

(21) Appl. No.: 17/124,724

(22) Filed: Dec. 17, 2020

(65) Prior Publication Data

US 2021/0105319 A1 Apr. 8, 2021

Related U.S. Application Data

(63) Continuation of application No. PCT/FR2019/051682, filed on Jul. 5, 2019.

(30) Foreign Application Priority Data

Jul. 6, 2018 (FR) ...................................... 18 56240

(51) Int. Cl.

| | |
|---|---|
| *H04L 29/08* | (2006.01) |
| *H04L 12/24* | (2006.01) |
| *H04L 29/06* | (2006.01) |
| *H04L 67/1087* | (2022.01) |
| *H04L 41/0604* | (2022.01) |
| *H04L 67/61* | (2022.01) |
| *H04L 67/01* | (2022.01) |

(52) U.S. Cl.
CPC ...... *H04L 67/1091* (2013.01); *H04L 41/0627* (2013.01); *H04L 67/322* (2013.01); *H04L 67/42* (2013.01)

(58) Field of Classification Search
CPC ......... H04L 67/1087–1091; H04L 67/32–322; H04L 67/42; H04L 41/106–0627
See application file for complete search history.

(56) References Cited

U.S. PATENT DOCUMENTS

| | | | | |
|---|---|---|---|---|
| 7,664,048 | B1 * | 2/2010 | Yung | ...................... H04L 47/36 370/253 |
| 8,509,071 | B1 * | 8/2013 | Narayanaswamy | .... H04L 47/20 370/230 |

(Continued)

FOREIGN PATENT DOCUMENTS

| | | |
|---|---|---|
| EP | 1722509 B1 | 4/2009 |
| EP | 2916512 A1 | 9/2015 |

OTHER PUBLICATIONS

Dhamankar et al., Protocol Identification via Statistical Analysis (PISA), 2007, Black Hat, pp. 1-9 (Year: 2007).*

(Continued)

*Primary Examiner* — Clayton R Williams
(74) *Attorney, Agent, or Firm* — Frost Brown Todd LLC

(57) ABSTRACT

The invention concerns a method for identifying a protocol of a data stream exchanged between two entities of a telecommunication network, the processing method comprising the following steps: on receiving data of the data stream, grammatical parsing of said data stream in order to identify a protocol of the data stream; in the event of failure to identify the protocol of the data stream by grammatical parsing, consulting a signature engine mapping protocols with corresponding signatures, and sequentially applying signatures to the data flow in order to identify a data stream protocol.

9 Claims, 3 Drawing Sheets

(56) References Cited

U.S. PATENT DOCUMENTS

| | | | |
|---|---|---|---|
| 9,112,915 B2* | 8/2015 | Su | H04L 69/22 |
| 2006/0106583 A1 | 5/2006 | Fdida et al. | |
| 2013/0238782 A1 | 9/2013 | Zhao et al. | |
| 2015/0052601 A1* | 2/2015 | White | H04L 63/1416 |
| | | | 726/13 |
| 2016/0149792 A1* | 5/2016 | Wang | H04L 47/2475 |
| | | | 709/224 |
| 2018/0212998 A1* | 7/2018 | Ahuja | G06F 9/45558 |

OTHER PUBLICATIONS

International Search Report dated Sep. 10, 2019 for International Application No. PCT/FR2019/051682, 2 pages.

\* cited by examiner

IDENTIFICATION OF A PROTOCOL OF A DATA STREAM

This application is a continuation of PCT/FR2019/051682, entitled IDENTIFICATION OF A PROTOCOL OF A DATA STREAM, filed Jul. 5, 2019, the disclosure of which is incorporated by reference herein which claims priority to FR 18 56240 entitled IDENTIFICATION OF A PROTOCOL OF A DATA STREAM, filed Jul. 6, 2018, the disclosure of which is incorporated by reference herein.

The present invention relates to the processing of data in telecommunication networks, and in particular to the recognition of data stream protocols.

It relates more specifically to applications for monitoring and categorizing data streams that are conveyed over telecommunication networks, for example Internet streams.

Hereinafter, "data stream" is intended to mean any set of data exchanged between two network entities, for example between a client and a server, or between two clients (known as peer-to-peer, or P2P, streams).

It is known practice to apply various data stream classification methods to detect a data format, or a protocol employed for transporting said data, in order to filter the data streams and to categorize a stream so as to allow the data stream to be processed on the basis of the classification thereof.

To this end, stream analyzers can be arranged for interception in network access points such as Wi-Fi hotspots, firewalls or proxy servers, for example.

In a firewall, the configuration of a security system can be based on the recognition of properties of certain protocols in order to prevent certain types of transfer. A data stream analyzer thus makes it possible to provide the firewall with a classification of the data stream based on the recognized protocols.

For example, with reference to FIG. 1, a system for analyzing traffic between two (client and/or server) entities includes a first network 100, which comprises a first entity 112 (of client type, for example) and is connected to a second network 110, which comprises a second entity 111 (of server type, for example), by a communication link 120. The link 120 is analyzed by an analyzer 300, which measures and analyzes the traffic in both directions or in a single direction between the first network 100 and the second network 110. The traffic between the networks 100 and 110 may be of the order of a gigabit per second, Gbps, in company networks, but may reach around ten Gbps in the core of a network of an operator.

The amount of data conveyed over a telecommunication network moreover makes analysis and classification costly in terms of resources.

The measurement and analysis capacity of the analyzer 300 is determined by the number N of simultaneous streams and the bit rate T of each stream. N directly affects the amount of memory required to manage the context of the recorded streams, while T has a direct impact on the computing power required to implement the analysis and the classification without significant packet loss and without delaying the stream. T defines the amount of packets to be processed within a given period of time and therefore the amount of processing resources that can be allocated to each packet.

In known systems, the amount of processing resources increases proportionally with the increase in streams N. With fixed resources, a data infrastructure can only increase N by reducing T, or increase T by reducing N. In other words, the product of N*T remains substantially constant.

However, in practice, N and T both increase proportionally in existing computer networks.

In order to overcome such drawbacks, the patent EP1722509 by the same applicant proposes a hierarchal analysis based on protocol recognition that is initially explicit and later implicit, if explicit recognition is not possible.

Explicit recognition is in particular implemented when a layer of a given level explicitly indicates the protocol used for the higher-level layer that it encapsulates. For example, the Ethernet layer explicitly indicates whether the higher layer is IPv4 or IPv6, and IP indicates whether the higher layer is TCP or UDP. Such recognition is easy and requires little computing power.

As for application-level layers, they are usually identified by an implicit recognition method which is costlier in terms of resources since they are not explicitly indicated by the lower-level transport layer.

Moreover, the variety of encoding for protocols at this level and the emergence of communication encryption require new protocol recognition methods.

For example, the identification of protocols such as SMTP and HTTP is easier and less resource-intensive than the identification of a protocol such as BitTorrent, in which the data are encrypted. There is therefore a need to optimize the classification of data streams by reducing complexity without reducing reliability.

The present invention improves the situation.

To this end, the invention proposes a method for identifying a protocol of a data stream exchanged between two entities of a telecommunication network, the processing method comprising the following steps:

on receiving data of the data stream, parsing the data stream in order to identify a protocol of the data stream;

in the event of failure to identify the protocol of the data stream by means of the parsing, consulting a signature engine that matches protocols with corresponding signatures, and sequentially applying the signatures to the data stream in order to identify a protocol of the data stream.

Parsing is not very resource-intensive in terms of computational resources and makes it possible to identify most of the protocols that cannot be identified explicitly. The analysis method based on the signatures, which are more resource-intensive in terms of computational resources, is implemented only if the parsing has failed, which makes it possible to optimize the use of resources during implicit identification of a protocol.

According to one embodiment, the invention may further comprise, in the event of failure to identify the protocol of the data stream by consulting the signature engine, applying a statistical protocol recognition method in order to identify the protocol of the data stream.

Such a method is also resource-intensive in terms of computational resources and is not totally reliable. It is therefore advantageously implemented if the first two methods have failed. Moreover, it makes it possible to recognize encrypted protocols such as BitTorrent, which cannot be recognized by the previous two methods.

According to one embodiment, the identified protocol may be an application-level protocol.

Application-level protocols, and more generally the protocols of layers 5 to 7 of the OSI model, are not explicitly indicated by the lower-level layers, and the method is therefore advantageously applied thereto according to this embodiment.

According to one embodiment, in the event of success in identifying the protocol of the data stream by means of the parsing, the method may further comprise a step of identifying protocol data by applying a one-pass algorithm to context elements of the data stream depending on the identified protocol.

Such an algorithm is not very resource-intensive and thus makes it possible, for a given identified protocol, to differentiate the data transported thereby between different types of protocol data.

In addition, in the event of failure to identify protocol data by applying the one-pass algorithm, the method may further comprise consulting a signature engine that matches protocol data with corresponding signatures, and sequentially applying the signatures to the data stream in order to identify the protocol data of the data stream.

Thus, the analysis method based on the signatures, which are more resource-intensive in terms of computational resources, is implemented only if the parsing has failed, which makes it possible to optimize the use of resources during implicit identification of protocol data.

According to one embodiment, the method may further comprise a step of processing the data stream on the basis of the identified protocol of the data stream.

Thus, protocol-differentiated processing may be applied.

In addition, processing the data stream may comprise at least one of the steps from among:

applying a service quality policy depending on the identified protocol; or authorizing or prohibiting the data stream on the basis of the identified protocol.

A second aspect of the invention relates to a computer program product including instructions for implementing the method according to the first aspect of the invention when this program is executed by a processor.

A third aspect of the invention relates to a device for identifying a protocol of a data stream exchanged between two entities of a telecommunication network, the device comprising:

an interface configured to receive data of the data stream;

a processor configured to:

parse the data stream in order to identify a protocol of the data stream;

in the event of failure to identify the protocol of the data stream by means of the parsing, consult a signature engine that matches protocols with corresponding signatures, and sequentially apply the signatures to the data stream in order to identify a protocol of the data stream.

Other features and advantages of the invention will become apparent on examining the detailed description below and the appended drawings in which.

Figure 1:
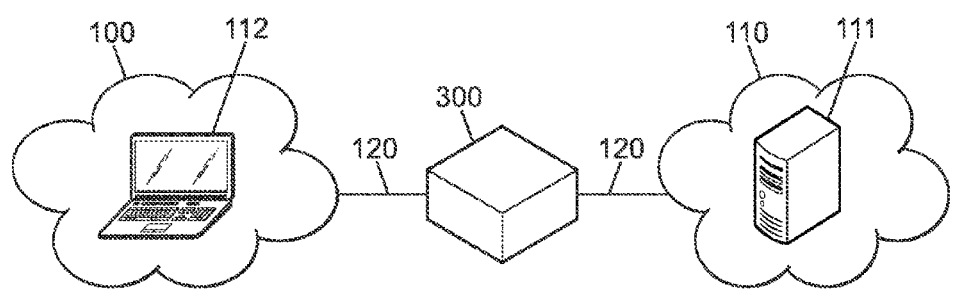
FIG. 1 illustrates a general architecture of a system according to one embodiment of the invention.

The invention can be implemented in a protocol identification device such as the analyzer 300 illustrated in FIG. 1. The identification device will be presented in greater detail with reference to FIG. 3.

Figure 2:
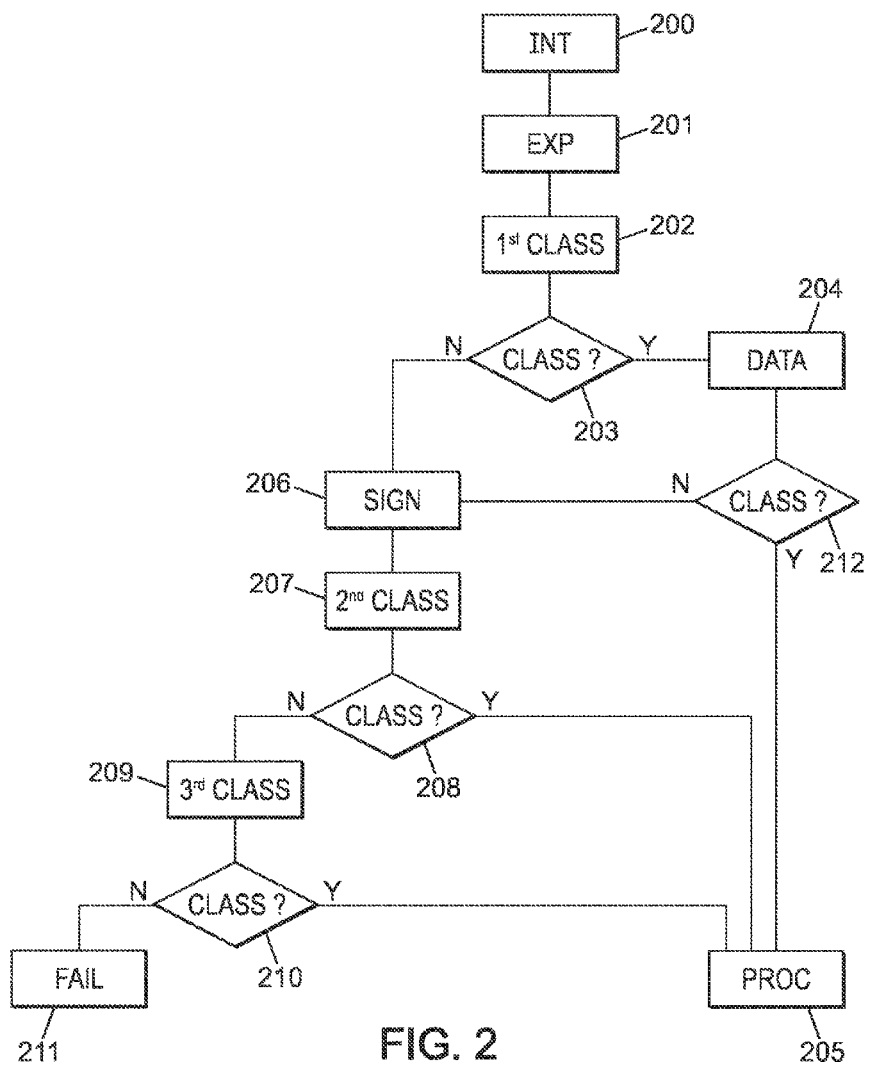
FIG. 2 is a diagram presenting the steps of a processing method according to one embodiment of the invention.

FIG. 2 presents the steps of a protocol identification method according to one embodiment of the invention.

In a step 200, one or more packets of a stream are received by the identification device, for example after interception of the packets by the analyzer 300 on the communication link 200.

In a step 201, a received data packet can be identified in order to be associated with an existing stream, or in order to create a new entry in a table listing the current data streams. For example, an IP address (and optionally a port number) of a source entity and an IP address (and optionally a port number) of a recipient entity can be taken into account to identify the stream corresponding to the packet. Such a technique is well known and will not be explained in greater detail.

The source or recipient entity may refer either to a client or to a server. The client may be a laptop or desktop computer, a touchscreen tablet, a smartphone or else any electronic device comprising an interface that makes it possible to communicate in the network 100 or 110, for example the Internet. According to the invention, the two communicating entities may be in two separate networks, as illustrated in FIG. 1, or may belong to the same network.

The low-layer protocols of the data stream can be determined in step 201 by explicit recognition. As mentioned above, explicit recognition requires little computing power in that the protocol of a layer of a given level may be indicated explicitly by the layer of the level immediately below it.

Thus, it can for example be determined that the IPv4 or IPv6 protocol is used on the basis of Ethernet layer data. Likewise, the IP layer indicates whether the UDP or TCP protocol is used.

From step 202 onwards, the aim of the method according to the invention is to identify a protocol that is not explicitly indicated by the lower-level layers. Such identification is therefore implicit. For example, the recognition of a protocol of the layers of levels 5 to 7 of the OSI level, and in particular of level 7 (application), is considered.

In a step 203, the identification device implements parsing of the data of the data stream, which are contained in the packet or packets of the data stream, in order to identify a protocol of the data stream. Indeed, certain protocols of the application level have grammar that is readily identifiable by using low computing power. This is the case, for example, for the SMTP and HTTP protocols. Such protocols have context elements that are useful for the recognition thereof. For example, they both use a "handshake" process to set up the stream. Other protocols, such as SSL or SIP, can also be identified by recognizing their grammar. It should be noted that, statistically, 90% of the application protocols of the streams to be classified can be recognized by using step 203. The prioritized initial use of such a recognition method thus makes it possible to recognize a large number of protocols with low computing power.

In step 203, it is checked whether the protocol of the data stream has been successfully identified by means of the parsing.

In the event of success in identifying the protocol of the data stream by means of the parsing, the method may further comprise a step 204 of identifying protocol data by applying a one-pass (or "single-pass") algorithm to context elements of the data stream depending on the identified protocol. The one-pass algorithm may depend on the identified protocol.

The identification of the protocol data can be considered to be the identification of an application or sub-application of a layer higher than the layer of the protocol identified in step 203. For example, if the protocol is identified as being HTTP, the sub-application of a higher layer, or protocol data, may be Facebook™ data, for example.

The application of the one-pass algorithm may consist in inputting context elements of the stream (for example, for HTTP, the context elements may be elements such as the URL, User Agent, etc.) into a rules engine. "Context element of the stream" refers to any header or payload element of the data stream. The use of a one-pass algorithm is not very costly in terms of computational resources, and the processing time is fixed and does not depend on the number of inputs.

In response to the input of the context elements, the rules engine can return a set of rules that can be tested on the data of the protocol identified in step 102 in order to identify the protocol data. For example, having identified the HTTP protocol in step 202, the protocol data can be identified as being Facebook™ data.

In a step 212, it is checked whether the protocol data have been identified in step 204 by means of the one-pass algorithm. In the event of success, the method continues with step 205. In the event of failure, the method moves on to step 206, which is described below.

Steps 204 and 205 are optional, and the method can move directly from step 203 to 205 in the event of positive identification in step 203.

Once the protocol and, optionally, the protocol data have been identified, the method may comprise applying a step 205 of processing the data stream on the basis of the identified protocol and, optionally, on the basis of the application data. The processing of the stream may, for example, consist in applying a service quality policy depending on the identified protocol or in authorizing or prohibiting the data stream on the basis of the identified protocol, or it may more generally consist in classifying the stream on the basis of the identified protocol. The classification may be transmitted to a processing device external to the protocol identification device.

In the event of failure to identify the protocol of the data stream by means of the parsing in step 202, the method according to the invention comprises a step 206 of consulting a signature engine that matches protocols with corresponding signatures. In a step 207, the signatures are sequentially applied to the data stream in order to identify the application-level protocol of the data stream. Such sequential application is costlier in terms of resources, and is thus advantageously applied only if the parsing in step 202 has failed.

Statistically, such a signature search method makes it possible to access half of the 10% of application protocols that have not been able to be identified by the parsing method (i.e. 5% of protocols). Although it is costlier in terms of computational resources, the signature search method nonetheless remains reliable.

Steps 206 and 207 can also be applied to the protocol data if identification has failed in step 204. In this case, the protocol data are compared with signatures in order to identify them.

In a step 208, it is checked whether the protocol of the data stream has been successfully identified by the signature search method.

In the event of success, the method returns to step 205, which has been described above.

In the event of failure, one embodiment of the invention may provide for an additional step 209 of applying a statistical protocol recognition method in order to identify the application protocol of the data stream (or the protocol data). Such a method in particular makes it possible to identify encrypted protocols, such as BitTorrent. Such a method is costly in terms of computing power (sequential search) and is not totally reliable. However, it does make it possible to identify 1 to 2% of the protocols or protocol data that have not been identified by the methods implemented previously.

In a step 210, it is checked whether the protocol of the data stream has been successfully identified by the statistical method.

In the event of success, the method returns to step 205, which has been described above.

In the event of failure (statistically in about 3% of cases), the method ends without being able to identify the application protocol of the data stream. A predefined processing operation can be applied in a step 211 in the event of failure. For example, as a precautionary measure, the data stream can be blocked.

The invention also provides for the incremental application of protocol recognition methods, from the method that is the most reliable and the least costly in terms of computing power to the method that is the least reliable and the most resource-intensive. It thus optimizes the search for the application-level protocol.

Figure 3:
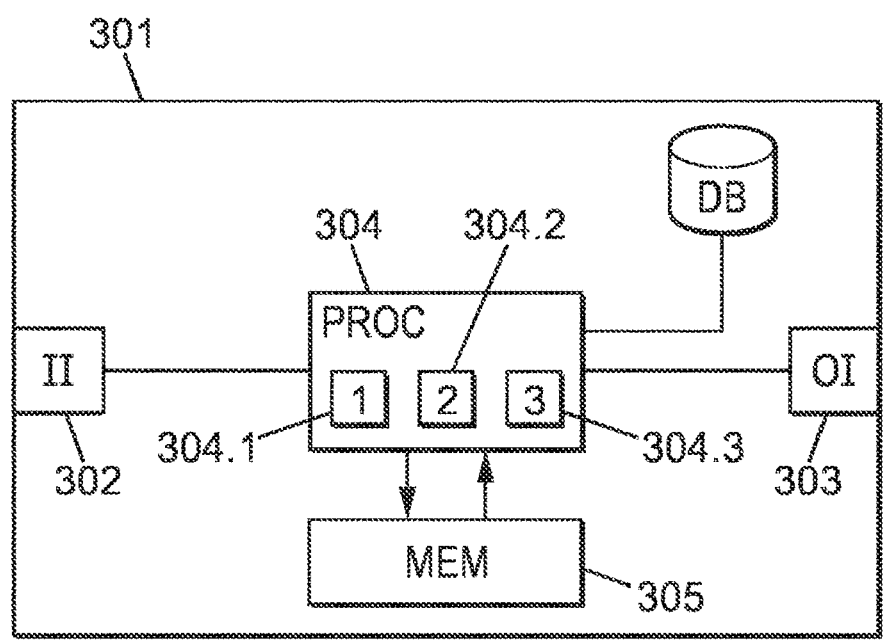
FIG. 3 illustrates the structure of a data processing device according to one embodiment of the invention.

FIG. 3 shows a protocol identification device 301 according to one embodiment of the invention.

The identification device 301 can be implemented in the analyzer 300, which is located for interception between the networks 100 and 110 in FIG. 1. More generally, it is capable of receiving data of data streams conveyed between two network entities.

The identification device comprises a random-access memory 305 and a processor 304, and also a memory 301 for storing instructions that make it possible to implement the steps of the method described above with reference to FIG. 2. The processor may comprise sub-entities 304.1 to 304.3, which are dedicated respectively to the three recognition methods described above.

The memory 301 may additionally store data used by the processor to implement the method, in particular:
the signature engine that matches signatures with corresponding protocols;
the sets of rules associated with given protocols, for the recognition of protocol data;
rules of statistical protocol recognition methods.

The identification device 301 further includes an input interface 302, which is intended to receive data of data streams conveyed over the communication link 200 or within a given network.

The identification device 301 further comprises an output interface 303, which is capable of providing a protocol identification result, or a command determined on the basis of the identified protocol.

Of course, the present invention is not limited to the embodiment described above by way of example; it extends to other variants.

The invention claimed is:

1. A method for identifying a protocol of a data stream exchanged between two entities of a telecommunication network, the processing method comprising the following steps:
receiving data of the data stream, parsing the data stream in order to identify a protocol of the data stream;
in the event of failure to identify the protocol of the data stream by means of the parsing, consulting a signature engine that matches protocols with corresponding signatures, and sequentially applying the signatures to the data stream in order to identify a protocol of the data stream.

2. The method of claim 1, further comprising, in the event of failure to identify the protocol of the data stream by consulting the signature engine, applying a statistical protocol recognition method in order to identify the protocol of the data stream.

3. The method of claim 1, wherein the identified protocol is an application-level protocol.

4. The method of claim 1, wherein, in the event of success in identifying the protocol of the data stream by means of the parsing, the method further comprises a step of identifying protocol data by applying a one-pass algorithm to context elements of the data stream depending on the identified protocol.

5. The method of claim 4, wherein, in the event of failure to identify protocol data by applying the one-pass algorithm, the method further comprises consulting a signature engine that matches protocol data with corresponding signatures, and sequentially applying the signatures to the data stream in order to identify protocol data of the data stream.

6. The method of claim 1, further comprising a step of processing the data stream on the basis of the identified protocol of the data stream.

7. The method of claim 6, wherein the processing of the data stream comprises at least one of the steps from among:

applying a service quality policy depending on the identified protocol; or authorizing or prohibiting the data stream on the basis of the identified protocol.

8. A non-transitory computer-readable medium comprising a computer program product stored thereon and including instructions for implementing the method of claim 1 when this computer program product is executed by a processor.

9. A device for identifying a protocol of a data stream exchanged between two entities of a telecommunication network, the device comprising:

an interface configured to receive data of the data stream;

a processor configured to:

parse the data stream in order to identify a protocol of the data stream;

in the event of failure to identify the protocol of the data stream by means of the parsing, consult a signature engine that matches protocols with corresponding signatures, and sequentially apply the signatures to the data stream in order to identify a protocol of the data stream.

* * * * *